United States Patent [19]

Fujioka

[11] Patent Number: 5,430,652
[45] Date of Patent: Jul. 4, 1995

[54] ESTIMATED VEHICLE BODY SPEED CALCULATING APPARATUS

[75] Inventor: Hiedaki Fujioka, Itami, Japan

[73] Assignee: Sumitomo Electric Industries, Ltd., Osaka, Japan

[21] Appl. No.: 151,131

[22] Filed: Nov. 12, 1993

[30] Foreign Application Priority Data

Dec. 25, 1992 [JP] Japan .................. 4-346143

[51] Int. Cl.⁶ .................................. B60T 8/66
[52] U.S. Cl. ..................... 364/426.02; 364/426.03; 364/565; 303/103; 303/109
[58] Field of Search ........... 364/426.01, 426.02, 364/426.03, 565; 180/197; 303/95, 100, 109, 103

[56] References Cited

U.S. PATENT DOCUMENTS

| | | | |
|---|---|---|---|
| 4,439,832 | 3/1984 | Sato et al. ................. | 303/97 |
| 4,675,819 | 6/1987 | Fennel .................... | 303/105 |
| 4,774,667 | 9/1988 | Kuraoka et al. ............. | 364/426.02 |
| 4,787,682 | 11/1988 | Muto ..................... | 303/109 |
| 4,836,618 | 6/1989 | Wakata et al. .............. | 303/103 |
| 4,969,100 | 11/1990 | Takata et al. ............... | 364/426.02 |
| 4,970,649 | 11/1990 | Matsuda .................. | 364/426.02 |
| 4,982,806 | 1/1991 | Yoshizawa et al. ........... | 364/426.02 |
| 4,991,910 | 2/1991 | Shimanuki et al. ........... | 364/426.02 |
| 5,033,799 | 7/1991 | Braschel .................. | 303/109 |
| 5,058,019 | 10/1991 | Litkouhi .................. | 364/426.02 |
| 5,173,860 | 12/1992 | Walenty et al. ............. | 364/426.02 |
| 5,185,703 | 2/1993 | Okubo .................... | 364/426.02 |
| 5,210,690 | 5/1993 | Kageyama et al. ........... | 364/426.02 |
| 5,240,313 | 8/1993 | Yoshino et al. ............. | 364/426.02 |
| 5,246,279 | 9/1993 | Onaka et al. ............... | 364/426.02 |

FOREIGN PATENT DOCUMENTS 5-246317 9/1993 Japan .

Primary Examiner—Gary Chin
Attorney, Agent, or Firm—Sandler, Greenblum & Bernstein

[57] ABSTRACT

The apparatus is composed of calculation of a vehicle wheel speed of each vehicle wheel for each of control cycles, calculation of tolerance maximum reduced speed amount approximately proportional to the $\mu$ value of the road surface by a wheel cylinder fluid pressure, judgement as to whether the vehicle wheel speed at this time is reduced in speed larger than the estimated vehicle body speed at the last time in the tolerance maximum reduced speed amount at the reduced speed time. When the reduced speed is much larger, a value reduced in the tolerance maximum reduced speed amount from the estimated vehicle body speed at the last time is made an estimated vehicle body speed at this time. On the other hand, when the reduced speed is much smaller, the vehicle wheel speed at this time is made an estimated vehicle body speed at this time.

6 Claims, 12 Drawing Sheets

$$(-)\Delta WREFH = -\frac{MAX(PT_i, PL_i)}{A}$$

ESTIMATED VEHICLE BODY SPEED CALCULATING APPARATUS

BACKGROUND OF THE INVENTION

The present invention generally relates to an apparatus for estimating the body speed of a vehicle, and more particularly, to an estimated vehicle body speed calculating apparatus for calculating the estimated vehicle body speed in a position of each vehicle of a vehicle body to be reduced in speed.

During the reduced speed of the vehicle body, a vehicle wheel may be sometimes locked when a brake is normally applied and a brake is excessively applied. There is an antilock control apparatus which is adapted to release such locked condition. The antilock control apparatus is adapted to regulate brake fluid pressures so that a vehicle wheel speed may become a proper valve with respect to a vehicle body speed. This apparatus is provided to realize the stability of the vehicle body, improve the steering performance of the vehicle body during braking, and the shortening of the stopping distance.

It is necessary, first, to correctly obtain the vehicle body speed to be reduced in speed so as to improve the antilock control apparatus. Although a method of directly detecting the vehicle body speed by a sensor or the like as a means for obtaining the vehicle body speed, it is not practical in use, because it is extremely expensive. In many cases, a method of estimating the vehicle body speed from the vehicle wheel speed detected is adopted.

There are many known examples of methods of estimating the vehicle body speed. A typical method is to calculate an estimated vehicle body speed with the use of a maximum value from among the vehicle wheel speeds of four wheels.

This method causes internal and external wheel speed differences when the vehicle body turns and runs. As a result, the vehicle wheel on the internal wheel side becomes smaller than the estimated vehicle body speed obtained, thus causing an excessive pressure reducing operation of the brake fluid pressure. The stopping distance is extended by the excessive pressure reducing operation, which causes inconveniences in terms of safety running operation.

An apparatus for calculating the estimated vehicle body speed which is independent in right and left is provided (U.S. Pat. No. 4,439,832) so as to remove the inconveniences.

Since the true vehicle body speed in each vehicle wheel position during its turning and running operation is different not only in right, left, but also between the front, rear wheels, it is hard to say that correct estimated vehicle body speed is obtained in the respective vehicle wheel positions even if the right, left independent estimated vehicle body speeds are calculated as described hereinabove.

Although an apparatus for independently calculating the estimated vehicle body speeds in all the wheels is proposed (U.S. Pat. No. 4,675,819), correct controlling operation cannot be effected, because the friction coefficients $\mu$ on the road surfaces are not taken into consideration sufficiently in the apparatus.

In U.S. Pat. No. 4,675,819, the reduction speed of the estimated vehicle body speed is adapted to depend upon the road surface $\mu$ value, concretely to become proportional inversely to a vehicle wheel reduction speed d on the assumption that the vehicle wheel reduction speed d (absolute value) becomes smaller as the road surface $\mu$ value becomes larger, and that the vehicle wheel reduction speed d (absolute value) becomes larger as the road surface $\mu$ value becomes smaller when the vehicle wheel reduction speed has exceeded a given value, for example, it is $-1.3$ g or lower.

Actually the vehicle wheel behavior is disturbed by the control situation, the road surface variation, the dispersion. This method cannot estimate the correct road surface $\mu$ values. The estimated vehicle body speed is calculated by larger or smaller reduction speeds than necessary.

According to the apparatus, the estimated vehicle body speed is adapted to have the same value as the vehicle wheel speed before the vehicle wheel reduction speed exceeds the given value ($-1.3$ g). When the vehicle wheel reduction speed is a value larger than the given value, for example, $-0.5$ g, the estimated vehicle body speed is also large separated from the actual vehicle body speed so that the antilock control operation can be properly effected no longer.

SUMMARY OF THE INVENTION

As in U.S. Pat. No. 4,675,819, a restriction value (in the above described embodiment, $-1.3$ g) of the reduction speed of the estimated vehicle body speed is provided. The value originally should be changed by a $\mu$ value of the road surface the car is running on. In the present invention, such a restriction value is changed in accordance with a wheel cylinder fluid pressure level showing the $\mu$ value of the road surface.

In the present invention, such a restriction value is varied in accordance with a wheel cylinder fluid pressure level at a control cycle time point or at a skid start time. It does not depend upon the vehicle wheel behaviors for each of control cycle time points as in the known example or the like while the skid is causing (when the estimated vehicle body speed > the vehicle wheel speed).

Although a pressure sensor may be used as a detection means of a wheel cylinder fluid pressure level, a wheel cylinder fluid pressure estimating means during a control operation presented (Japanese Patent Application No. 3-338400) already proposed by a present applicant can be used. If such a wheel cylinder pressure estimating means is used, the reduction in cost can be effected and also, the reduction pressure can be started with proper timing even when the vehicle wheel speed is slowly lowered so that such performance reduction as described hereinabove can be prevented.

The present invention provides a bottom limit value in an estimated vehicle body speed WREF of each wheel with respect to the maximum value WREFH among whole estimated vehicle body speeds so that unnecessary sinking may be prevented, because the estimated vehicle body speeds among the respective wheels are made different by amounts including diameter differences of the tires, speed differences between the internal and external wheels or front and rear wheels during the turning, running operation in the independent calculation of the estimated vehicle body speeds in the respective wheels.

BRIEF DESCRIPTION OF THE DRAWINGS

These and other objects and features of the present invention will become apparent from the following description of the preferred embodiments thereof with reference to the accompanying drawings, in which:

FIG. 6 is a partial drawing of a flow chart showing a modified example of the first embodiment;

DETAILED DESCRIPTION OF THE INVENTION

Figure 1:
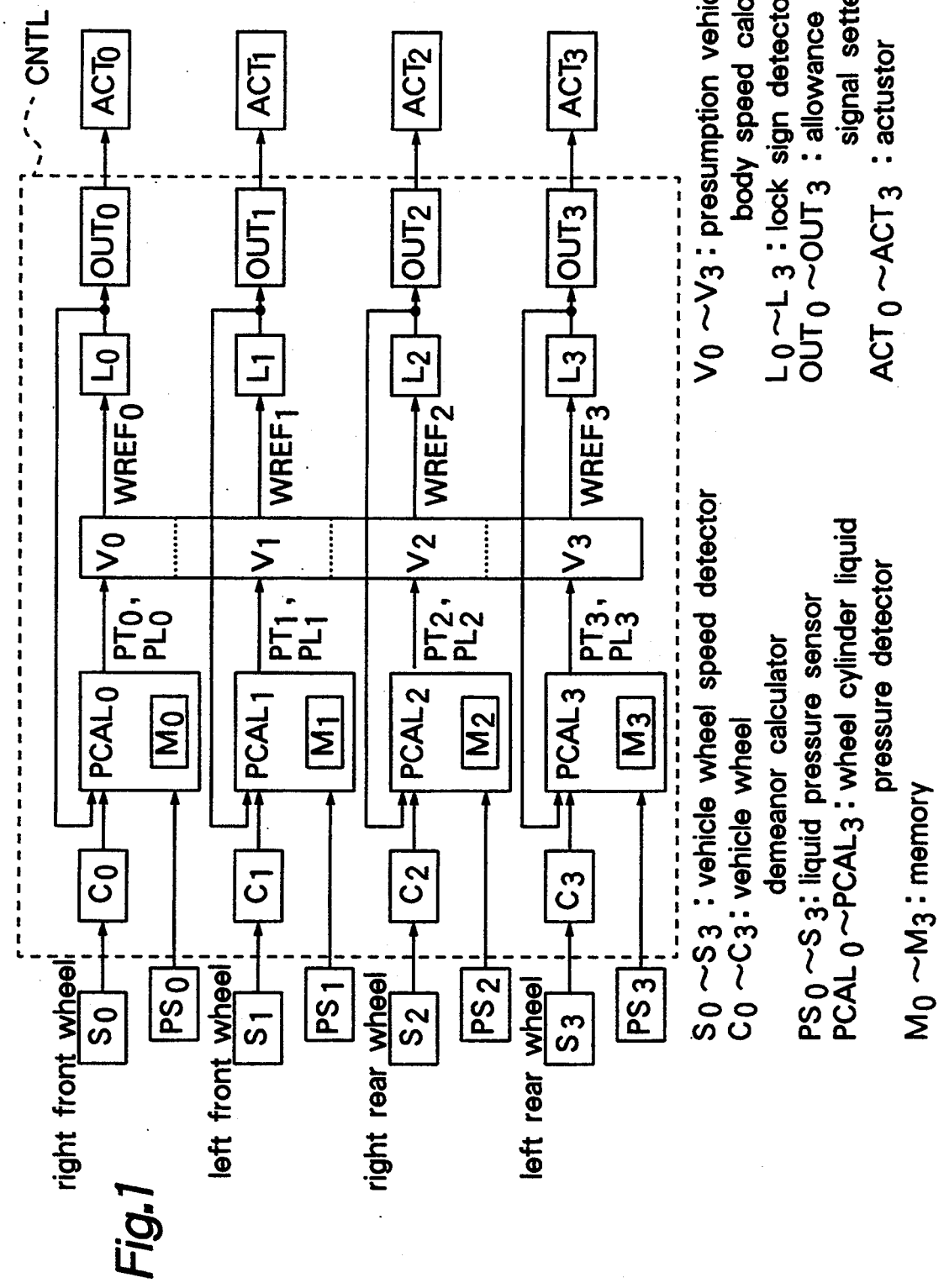
FIG. 1 is a block diagram of an estimated vehicle body speed calculating apparatus in accordance with the present invention.

Before the description of the present invention proceeds, it is to be noted that like parts are designated by like reference numerals throughout the accompanying drawings.

FIG. 1 shows a block diagram of an estimated vehicle body speed calculating apparatus in accordance with the present invention. Reference characters S0 to S3 show a vehicle wheel speed detecting portion, and accompanying letters 0, 1, 2, 3 respectively show a right front wheel, a left front wheel, a right rear wheel, a left rear wheel. PS0 through a PS3 are fluid pressure sensors which are adapted to detect the brake fluid pressure of each wheel. C0 through C3 are vehicle wheel behavior detecting portions which are adapted to calculate a speed by which each vehicle wheel is rotating, and its differential value. PCAL0 through PCAL3 are wheel cylinder fluid detecting portions which are adapted to convert fluid pressures detected by fluid pressure sensors PS0 through PS3 into a data processable by a computer. Wheel cylinder fluid pressure detecting portions PCAL0 through PCAL3 respectively have peak hold memories M0 through M3 which are adapted to retain a wheel cylinder fluid pressure at a skid start of the vehicle wheel, namely, at a lock indication detection time. V0 through V3 are estimated vehicle body speed detecting portions where a WREF3 is calculated and outputted from the estimated vehicle body speed WREF0 in the position of each vehicle wheel. Reference characters L0 through reference character L3 are lock indication detecting portions to detect whether or not a lock indication has been started on each of the vehicle wheels with the use of a vehicle wheel speed obtained at the estimated vehicle body speed WREF0 through WREF3, and the vehicle wheel behavior detecting portion C0 through C3, and their differential values. When the lock indication has been detected, the lock indication detecting signals outputted from the lock indication detecting portions are inputted into the corresponding wheel cylinder fluid pressure detecting portions PCAL0 through PCAL3, and also, are inputted even to the addition and subtraction pressure signal setting portions OUT0 through OUT3, and signals for antilock control are outputted. ACT0 through ACT3 are actuators such as solenoid valves or the like so as to reduce or increase the wheel cylinder fluid pressures.

In FIG. 1, a portion surrounded by dotted lines may be composed of a microcomputer.

Figure 2:
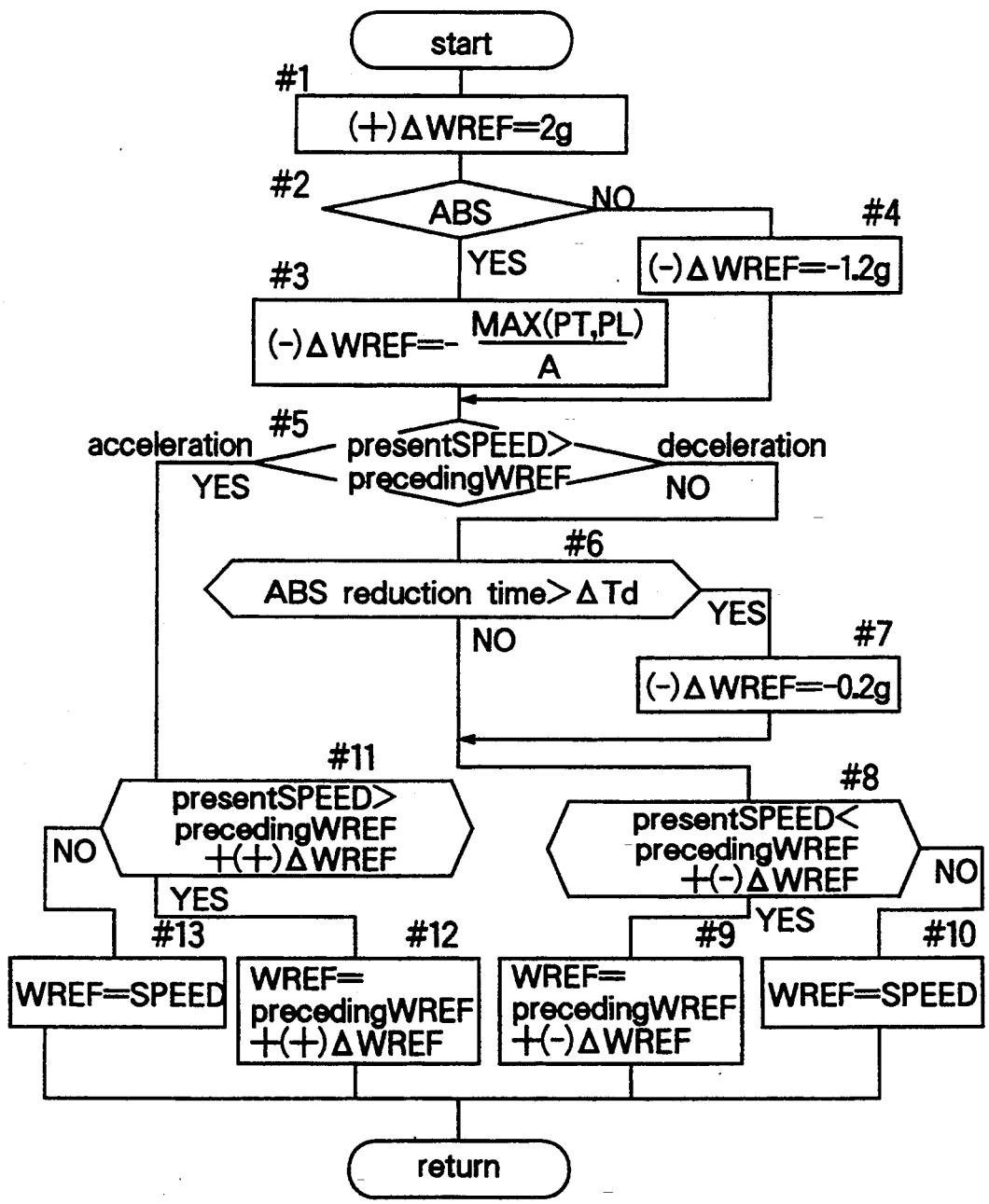
FIG. 2 is a flow chart in a first embodiment of the present invention.

FIG. 2 shows a flow chart in a first embodiment of an estimated vehicle body speed calculating apparatus in accordance with the present invention.

In step #1, an ascent maximum speed $((+)\Delta WREF)$ is set. The ascent maximum speed $((+)\Delta WREF)$ means a maximum tolerance acceleration of a vehicle, and shows a maximum tolerance variation amount of the differences between the estimated vehicle body speed at the control cycle at this time and the estimated vehicle body speed in the next control cycle when the vehicle is being accelerated. In the flow chart of FIG. 2, it is set to 2 g (g is gravity acceleration.)

At step #2, it is judged whether or not the antilock brake is controlled. If it is under control, the step advances to step #3. If it is not under control, the step advances to step #4. At the step #4, a descent maximum speed $((31)\Delta WREF)$ is set. The descent maximum speed $((-)\Delta WREF)$ means a maximum tolerance reduction speed of a vehicle and shows a maximum tolerance variation amount of differences between the estimated vehicle body speed in the control cycle provided at this time and the estimated vehicle body speed in the control cycle at the next time. At the step #4, the antilock brake is not under control so that the vehicle is considered to be on a high $\mu$ road surface such as asphalt or the like, and a comparatively large descent maximum speed $((-(WREF)(=-1.2 g)$ is set.

At the step #3, a descent maximum speed $((-)\Delta WREF)$ under the control operation of the antilock brake is set. Since the antilock brake is under control here, it is considered that the vehicle is running on a low $\mu$ road surface, for example, a snowy road. In this case, the descent maximum speed $((-)\Delta WREF)$ is set to a comparatively small value. In the present invention, a small value is adapted to be set to a value proportional to a $\mu$ value on the road surface, namely, a value proportional to a wheel cylinder fluid pressure. In an embodiment shown in FIG. 2, at the step #3, the descent maximum speed $((-)\Delta WREF)$ is calculated in accordance with the following equation:

$$(-)\Delta WREF = MAX(PT,PL)/A \tag{1}$$

Reference character PT is a wheel cylinder fluid pressure in each control cycle, and reference character PL is a wheel cylinder fluid pressure stored in a peak hold memory at a time portion when the skid has been started. Reference character MAX means the provision of a larger one of a fluid pressure PT and a retained fluid pressure PL at each cycle time. Reference character A is a given constant and is set in accordance with the brake characteristics of the vehicle. In the present embodiment, it is set as A = 64.

At the step #5, it is judged whether or not actual vehicle wheel speed obtained of a cycle provided at this time is larger than the estimated vehicle body speed WREF provided at the last time. When it is judged to be larger, the speed is judged to be accelerated and the step advances to step #11. When it is judged to be smaller, the speed is judged to be being reduced and the step advances to step #6.

At the step #6, it is judged whether or not the wheel cylinder pressure has been continuously decreased by the antilock brake control for a given time $\Delta Td$ or more. Namely, at the step #6, it is detected when the brake is applied while a vehicle is running on a low $\mu$ road surface, or when the brake is applied while a vehicle is moving from a high $\mu$ road surface to a low $\mu$ road surface. When such a case is detected, the step advances to step #7 and the descent maximum speed is set to a comparatively small value $((-)\Delta WREF = -0.2\ g)$.

At the step #8, it is judged whether or not the vehicle wheel speed of a cycle provided at this time is smaller than a value where a descent maximum speed $((-)\Delta WREF)$ is added to an estimated vehicle body speed WREF provided at the last time. When it is not smaller, namely, the vehicle wheel speed provided at this time changes within a given range $((-)\Delta WREF)$, it is judged that a vehicle wheel is not skidding. The step advances to step #10 and the estimated vehicle body speed WREF to be provided at this time is set at a value equal to the vehicle wheel speed provided at this time. At the step #8, the step advances to step #9 when it is judged that the vehicle wheel speed at this time is smaller than a value where a descent maximum speed $((-)\Delta WREF)$ has been added to an estimated vehicle body speed WREF provided at the last time, namely, the vehicle wheel speed provided at this time exceeds a given range $((-)\Delta WREF)$ from the estimated vehicle body speed WREF provided at the last time and becomes smaller than it. It is judged that the lock indication, namely, the skid is caused on the vehicle wheel. The estimated vehicle body speed WREF provided at this time is set to a value where a descent maximum speed $((-)\Delta WREF)$ is added to an estimated vehicle body speed WREF provided at the last time.

A step advances to step #11 when it has been judged that it is being accelerated at the step #5. It is judged whether or not the vehicle wheel speed provided at this time is larger than a value where an ascent maximum speed $((+)\Delta WREF)$ is added to an estimated vehicle body speed WREF provided at the last time. When it is larger, the step advances to step #12. When it is smaller, the step advances to a step #13. At a step #13, it is judged that the vehicle wheel speed provided at this time is smaller than a value where an ascent maximum speed $((+)\Delta WREF)$ is added to the estimated vehicle body speed WREF provided at the last time, namely, the acceleration is a given amount $((+)\Delta WREF)$ or lower. The vehicle wheel speed provided at this time is used as the estimated vehicle body speed WREF as it is. At step #12, the vehicle wheel speed provided at this time is a given amount $((+)\Delta WREF)$ or more as compared with the estimated vehicle body speed WREF provided at the last time. The estimated vehicle body speed provided at this time is set to a value where an ascent maximum speed $((+)\Delta WREF)$ is added to an estimated vehicle body speed WREF provided at the last time.

Figure 3:
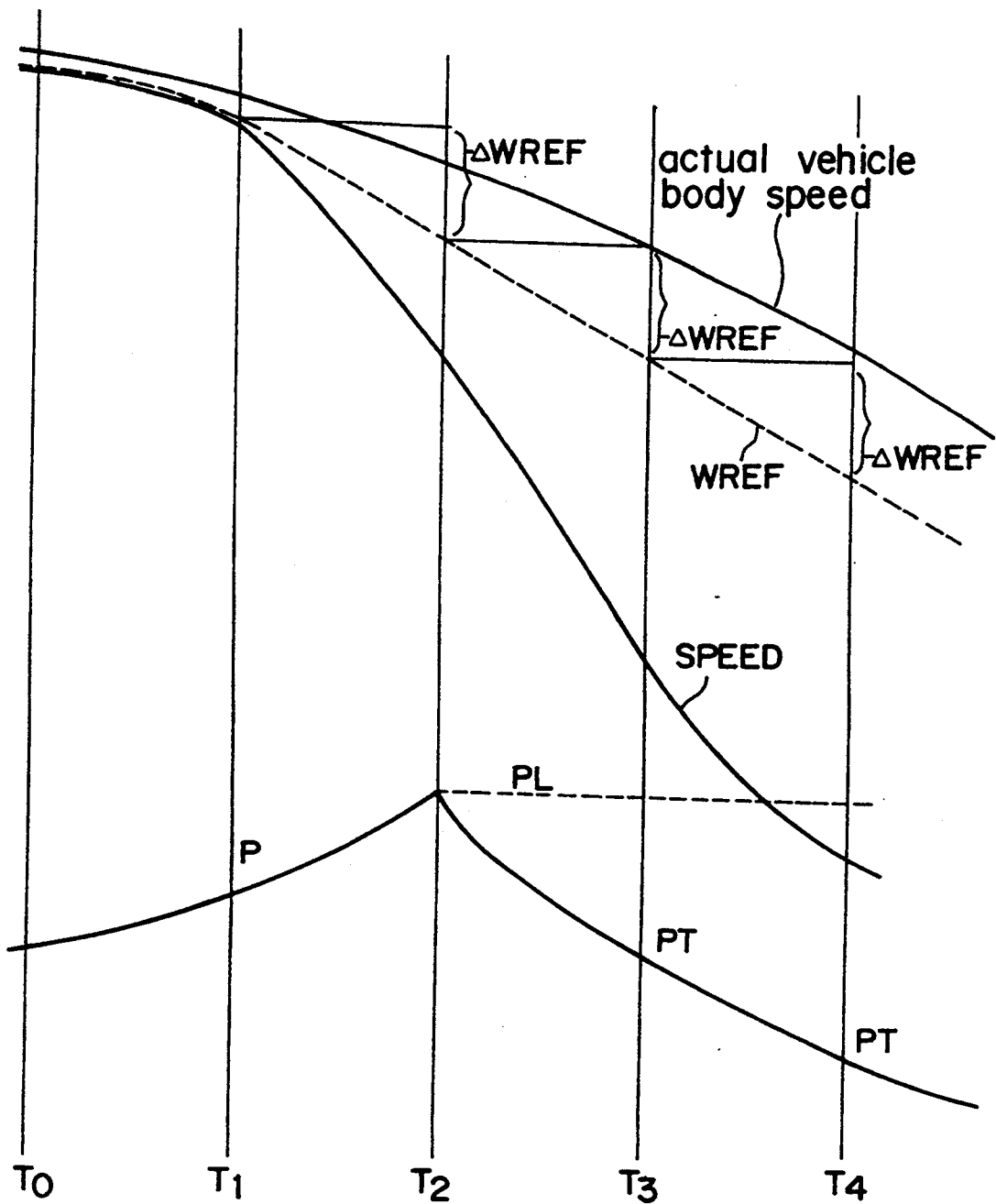
FIG. 3 is a graph showing an operation during the reduction speed.

FIG. 3 is a graph showing an operation during speed reduction, where a lock indication is detected at a time T2 and the fluid pressure P of the wheel cylinder is reduced at a time T2 or its subsequent. As the descent speed of the vehicle wheel speed from time T0 through T1 is smaller than the descent maximum speed $((-)\Delta WREF)$ at an absolute value, the step advances to steps #5, #8, #10, and the estimated vehicle body speed WREF is set to the actual vehicle wheel speed. Since the wheel cylinder pressure takes a peak value at a time T2, the value is retained in a peak hold memory M. As the vehicle wheel starts to lock at the time T2, the reduction speed of the vehicle wheel becomes a value larger than the descent maximum speed $((-)\Delta WREF)$ at an absolute value and is reduced at speed. Accordingly, the step advances to steps #5, #8, #9 and the estimated vehicle body speed WREF at the step T2 is set where a descent maximum speed $((-)\Delta WREF)$ is added to the estimated vehicle body speed WREF provided at the last time. The value obtained at the step #3 is used at the descent maximum speed. Namely, the wheel cylinder fluid pressure PT at the time point at the time T2 is compared with as a fluid pressure PL retained in the peak hold memory. The larger of the values PT and PL is divided by a given constant A and the result is set as the descent maximum speed $((-)\Delta WREF)$. Thus, in this case, a value retained in the peak hold memory is used.

Figure 4:
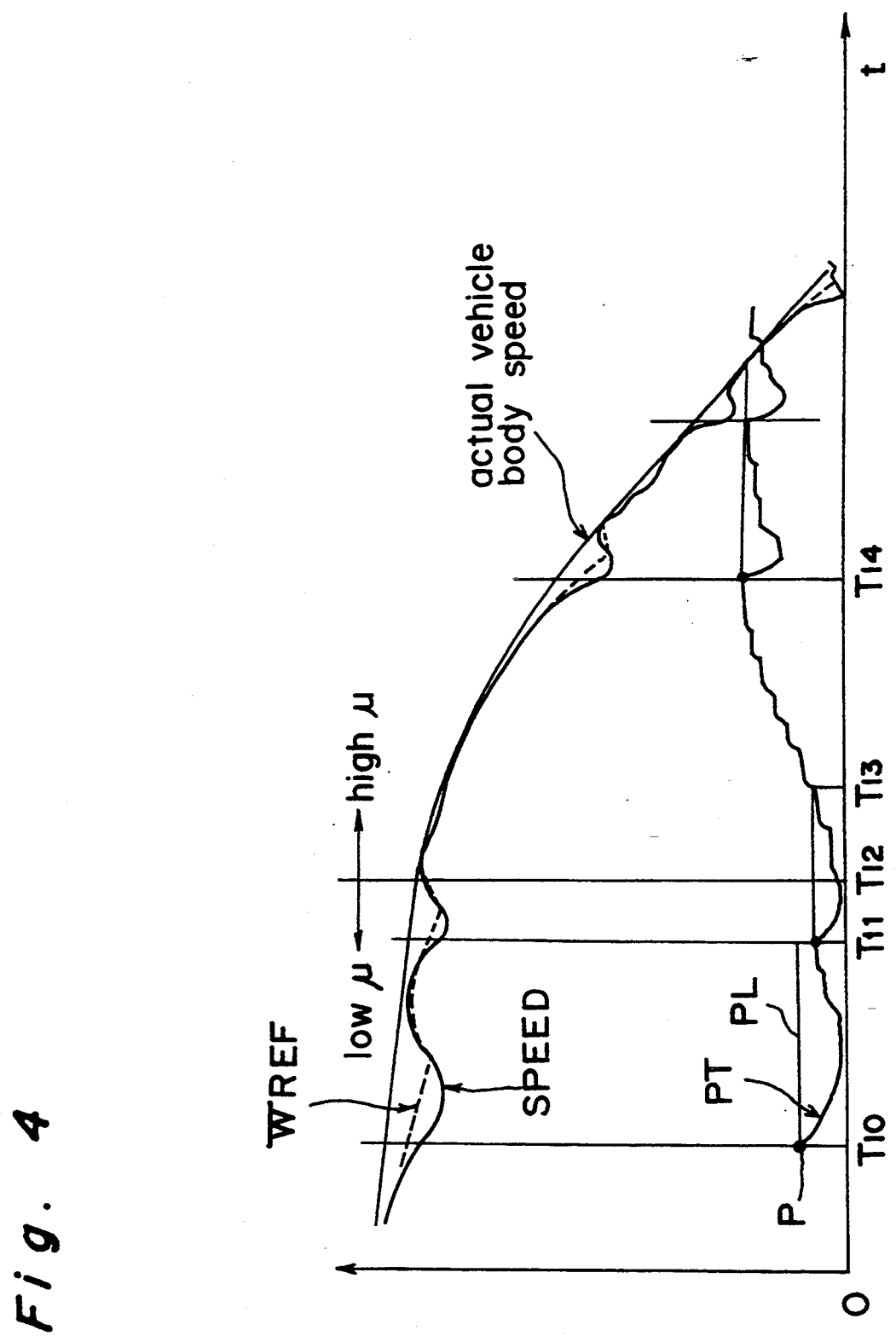
FIG. 4 is a graph showing an operation when a vehicle is moved from a low $\mu$ road surface to a high $\mu$ road surface.

FIG. 4 shows a graph where a vehicle has advanced from a low $\mu$ road surface to a high $\mu$ road surface during the reduction speed of the vehicle. At a time T10, a first lock indication is detected. At this time point, the wheel cylinder fluid pressure starts to reduce and also, the peak value at the time point is retained in the peak hold memory. For a time period from the time T10 to the next peak hold time point T11, a descent maximum speed $((-)\Delta WREF)$ is set at step #3 in accordance with a value PL retained in the peak hold memory and the estimated vehicle body speed is calculated (step #9) in accordance with the set value. At a time point T11, a second lock indication is detected and the wheel cylinder fluid pressure at the time point is newly retained in the peak hold memory so that the descent maximum speed $((-)\Delta WREF)$ is set in accordance with the newly retained fluid pressure level in the control after it.

At a time T12, the vehicle advances from the low $\mu$ road surface to the high $\mu$ road surface. The fluid pressure level P of the wheel cylinder gradually rises by the antilock control so that the wheel cylinder fluid pressure PT at the time point exceeds the fluid pressure PL retained in the peak hold memory at the time T13. At the time T13 and its subsequent control, the descent maximum speed $(\Delta WREF)$ is set in accordance with the fluid pressure PT at each cycle at the step #3, and the estimated vehicle body speed WREF is calculated at step #9 or at step #10 in accordance with the set value. At the time T13 and its subsequent, a rate of the reduction speed of the estimated vehicle body speed becomes larger. At the time T14, a third lock indication is caused and a vehicle is on a high $\mu$ road surface so that a lock indication is caused in a position where a wheel cylinder fluid pressure level is considerably high, namely, in a condition where the brake is applied considerably hard. At a time T14 and its subsequent, the descent maximum speed ((−)ΔWREF) is decided in accordance with the high wheel cylinder fluid pressure PL and the vehicle body speed is calculated in accordance with it.

Figure 5:
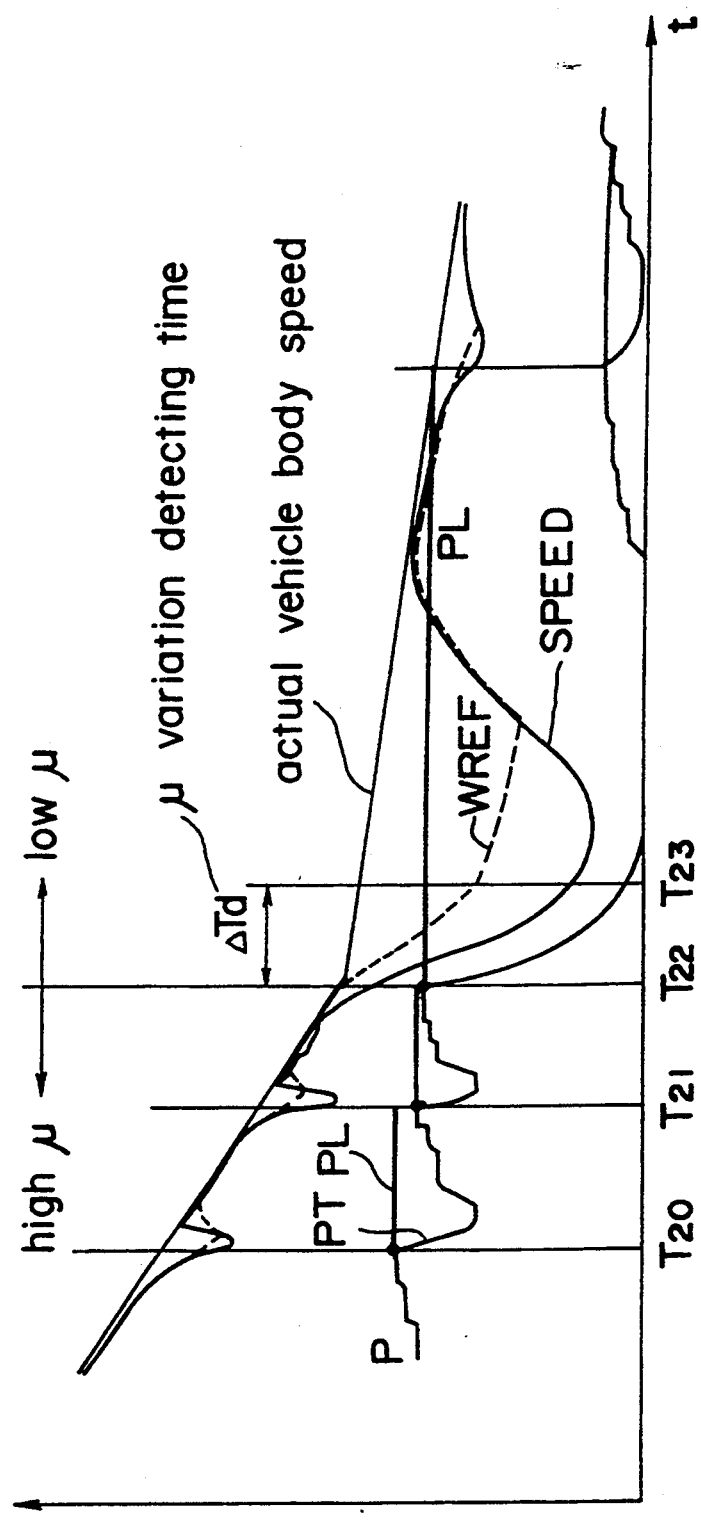
FIG. 5 is a graph showing the operation when a vehicle is moved from a high $\mu$ road surface to a low $\mu$ road surface.

FIG. 5 is a graph showing an action where a vehicle has moved from the high $\mu$ road surface to the low $\mu$ road surface. At the time T20, a first lock indication is detected and the vehicle is on the high $\mu$ road surface so that a wheel cylinder fluid pressure PL to be retained in the peak hold memory is comparatively high at level. Thus, a descent maximum speed ((−)ΔWREF) to be calculated at the step #3 also takes a comparatively large value. At a time T21, a second lock indication is detected. At time point, a slightly lower peak value than a peak value retained at the time T20 is retained in the peak hold memory. For a time period from the time T21 to a time point T22, when the next peak value is retained, a descent maximum speed ((−)ΔWREF) is decided in accordance with the wheel cylinder fluid pressure PL retained in the peak hold memory at the time T21. As the vehicle moves from the high $\mu$ road surface to the low $\mu$ road surface just before at the time T22, the reduction pressure of the wheel cylinder is continued for a comparatively long time by a reduction output. As a time when the reduction pressure output continues and is issued is longer than a given time ΔTd, it is detected that the road surface becomes a low $\mu$ road surface (step #6). The descent maximum speed ((−)ΔWREF) is set at a given small value, for example, −0.2 g after the lapse of a given time ΔTd. Thus, at time T23 and subsequent thereto, the estimated vehicle body speed WREF is reduced at a small value. As the vehicle wheel speed approaches an actual vehicle body speed, the estimated vehicle body speed WREF is decided by a vehicle wheel speed.

An estimated vehicle body speed calculating apparatus for antilock brake use in accordance with the present invention observes a point that the wheel cylinder fluid pressure under the antilock control shows a value corresponding to the friction coefficient $\mu$ of the road surface. As the descent maximum speed ((−)ΔWREF) is decided in accordance with the wheel cylinder fluid pressure, the speed can be reduced at a large value with regards to the high $\mu$ road surface. On the low $\mu$ road surface, the width of the reduction speed is made smaller so that the estimated vehicle body speed WREF is adapted to be obtained about each vehicle wheel.

Figure 6:
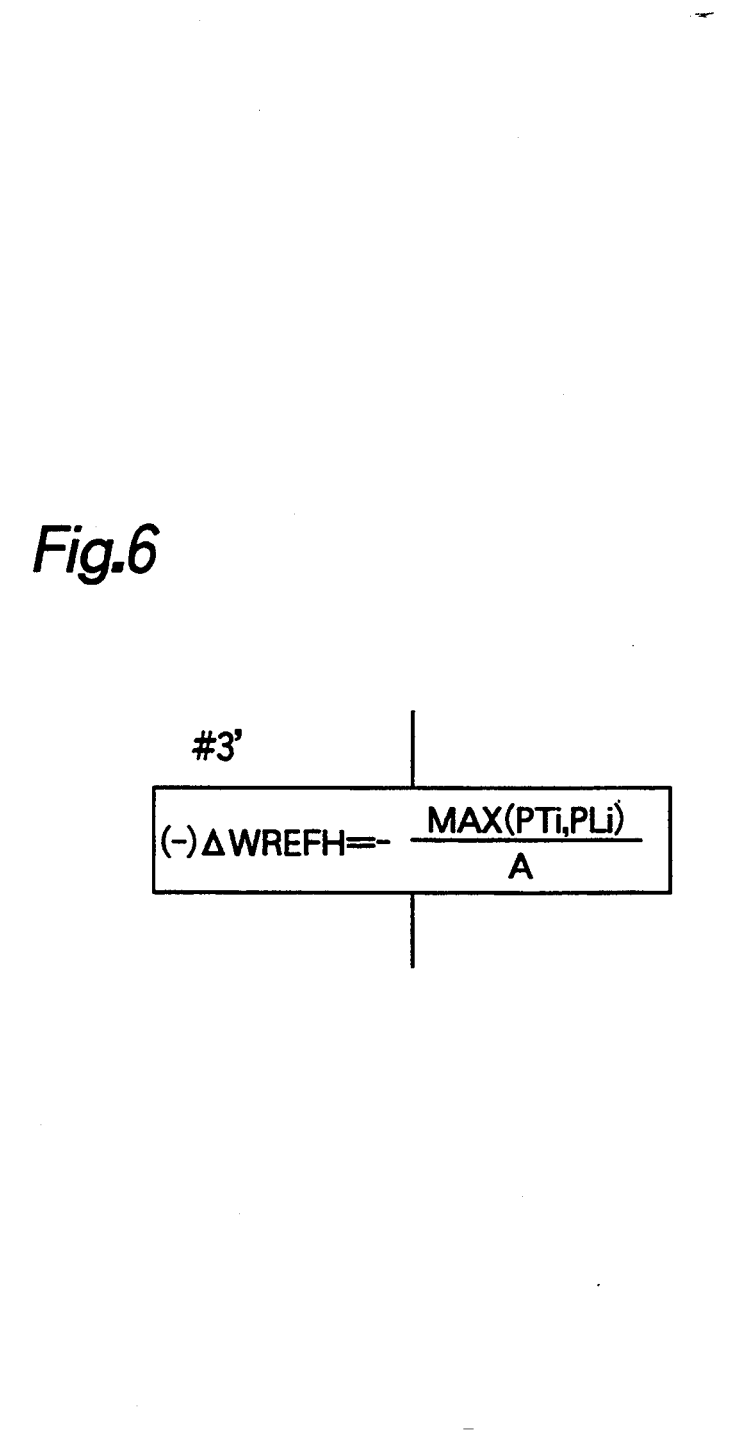

FIG. 6 shows a modified example of a first embodiment. A step #3', instead of a step #3 shown in FIG. 2 may be used. At the step #3', the largest from among the wheel cylinder fluid pressures PTi (i=0, 1, 2, 3) of each cycle to be obtained from all the four wheels and among the wheel cylinder fluid pressures PLi retained in the peak wheel memory of all the four wheels are selected and the descent maximum speed ((−)ΔWREF) is adapted to be decided by the largest divided with a given value. Even under the antilock control operation, the controlling operation is effected in accordance with the data from the vehicle wheel placed on the road surface where the friction coefficient $\mu$ of the road surface has a higher value. The control distance can be made shorter and the safety can be increased. When the vehicle is running in a corner, inner wheel cylinder pressures should be smaller than outer. This means that the pressure level of inner wheel does not show a real value of road surface $\mu$. In order to get an appropriate ΔWREF value also on an inner wheel, it is advantageous good to use the embodiment shown in FIG. 6.

FIG. 7 through FIG. 14 show a flow chart in accordance with a second embodiment of an estimated vehicle body speed calculating apparatus for antilock brake use in accordance with the present invention.

Figure 7:
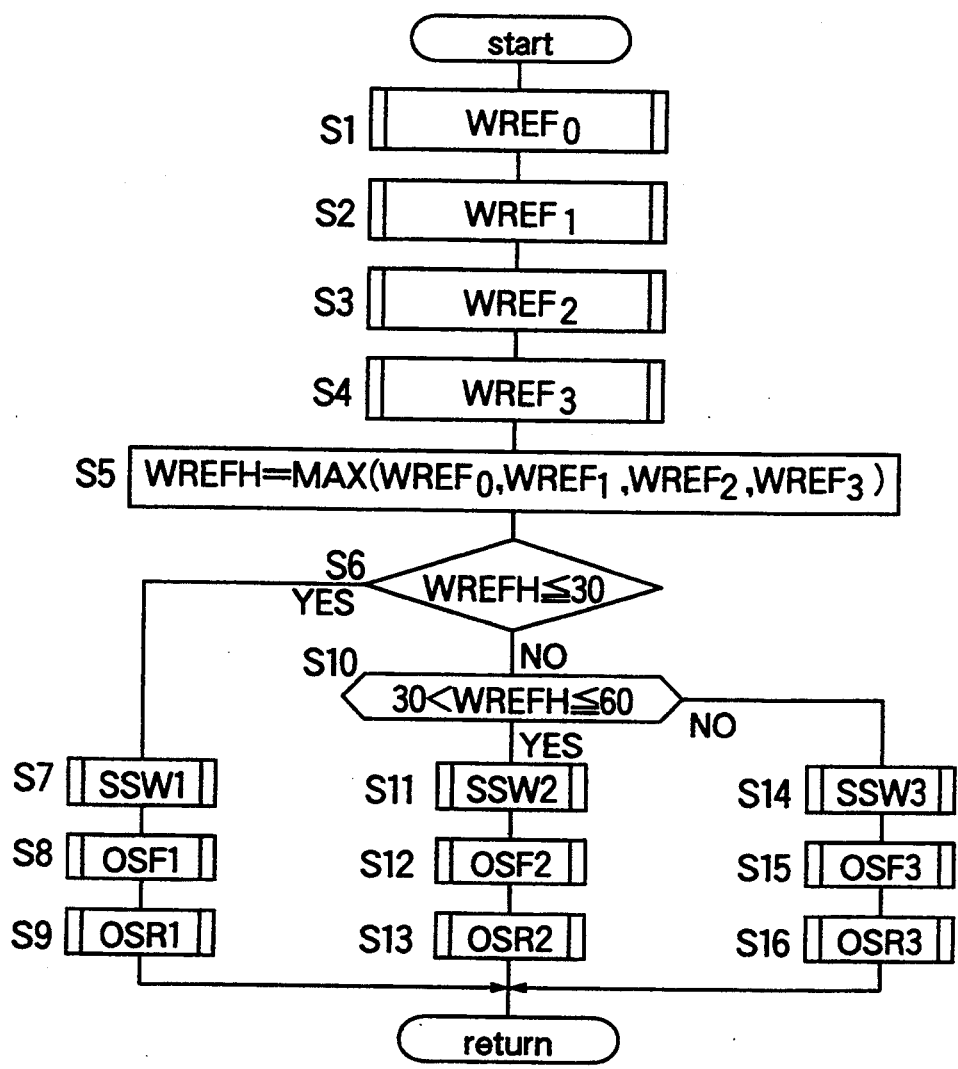
FIG. 7 is a flow chart in a second embodiment of the present invention.

In FIG. 7, step S1 shows a subroutine including a step 01 through the last step #13 shown in FIG. 2 and especially, an estimated vehicle body speed WREF0 is calculated about the right-side front wheel. Similarly, step S2 also shows a subroutine including a first step #13 from step #1 of FIG. 2 and especially, an estimated vehicle body speed WREF1 is calculated about the left-side front wheel. Similarly, at step S3, the estimated vehicle body speed WREF2 is calculated about the right-side rear wheel and at step S4, the estimated vehicle body speed WREF3 is calculated about the left-side rear wheel. At step S5, a maximum value among four estimated vehicle body speed WREF0 through WREF3 is detected, and the maximum is set as WREFH. At step S6, it is judged whether or not the maximum estimated vehicle body speed WREFH is 30 km per hour or lower. At step 10, it is judged whether or not the maximum estimated vehicle speed WREFH is between 30 km per hour and 60 km per hour. When the maximum estimated vehicle body speed WREFH is 30 km per hour or lower, the steps S7, S8, S9 are executed. When the maximum estimated vehicle body speed WREFH is between 30 km per hour and 60 km per hour, the steps S11, S12, S13 are executed. When the maximum estimated vehicle speed WREFH is 60 km per hour or more, the steps S14, S15, S16 are executed.

Figure 8:
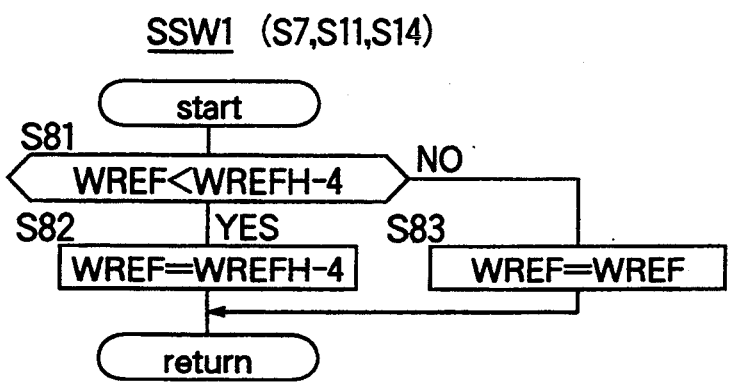
FIG. 8 is a flow chart showing the details of steps S7, S11, S14 shown in FIG. 7.
Figure 9:
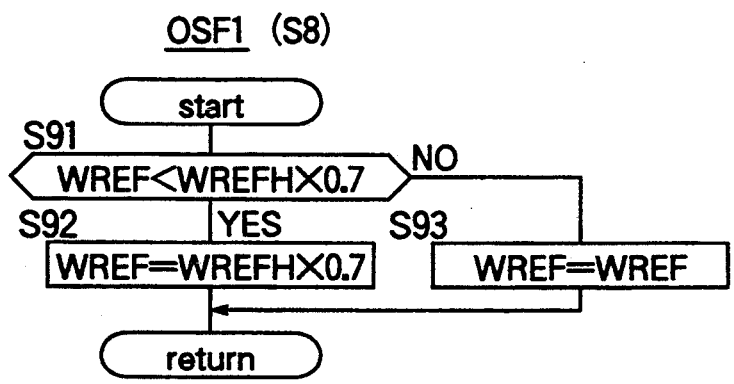
FIG. 9 is a flow chart showing the details of a step S8 shown in FIG. 7.
Figure 10:
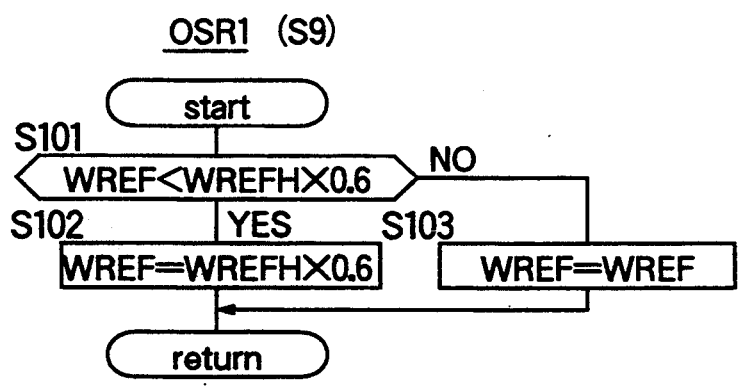
FIG. 10 is a flow chart showing the details of a step S9 shown in FIG. 7.

The details of the steps S7, S8 and S9 are respectively shown in FIG. 8, FIG. 9 and FIG. 10. At the step S7, the estimated vehicle body speed is set about a vehicle wheel SSW on the same side as the vehicle wheel whose maximum estimated vehicle body speed WREFH is detected. At the step S8, the estimated vehicle body speed is set about the vehicle wheel of the front wheel on the opposite side to the vehicle wheel whose maximum estimated vehicle body speed has been detected. At the step S9, the estimated vehicle body speed is set about the rear wheel on the opposite side to the vehicle wheel whose maximum estimated vehicle body sped is detected.

In FIG. 8, at the step S81, it is judged whether or not the estimated vehicle body speed WREF of a cycle provided at this time is smaller than a value where 4 km per hour has been subtracted from the maximum estimated vehicle body speed WREFH obtained by this time cycle about the vehicle wheel on the same side as the vehicle wheel whose maximum estimated vehicle body speed WREFH has been detected. When it is smaller, the step advances to step S82 and a value where 4 km per hour has been subtracted from the maximum estimated vehicle body speed WREFH at the last time is set as the estimated vehicle body speed WREF about the same slate vehicle wheel. When the estimated vehicle body speed WREF at this time of the same vehicle wheel is equal to or larger than a value where 4 km per hour has been subtracted from the maximum estimated vehicle body speed WREFH of this time, the step advances to step S83 and the estimated vehicle body speed WREF at this time is set as it is.

At the step S7, a value where 4 km per hour has been subtracted from the estimated vehicle body speed WREFH about a vehicle wheel on the same side as the maximum estimated vehicle body speed wheel is made a bottom limit value of the estimated vehicle body speed so that the estimated vehicle body speed in the vehicle wheel is prevented from being shifted from the estimated vehicle body speed in the other vehicle wheel.

FIG. 9 shows the details of the step S8, showing a flow chart for setting the estimated vehicle body speed about the front wheel on the opposite side to the maximum estimated vehicle body speed wheel. In this case, such a vehicle wheel is set not to become a value smaller than 70 percent of the maximum estimated vehicle body speed WREFH.

FIG. 10 shows the details of the step S9, shows a flow chart for setting the estimated vehicle body speed about the rear wheel on the opposite side to the maximum estimated vehicle body speed wheel. In this case, such a vehicle wheel is adapted not to become a value smaller than 60 percent of the maximum estimated vehicle body speed WREFH.

Figure 11:
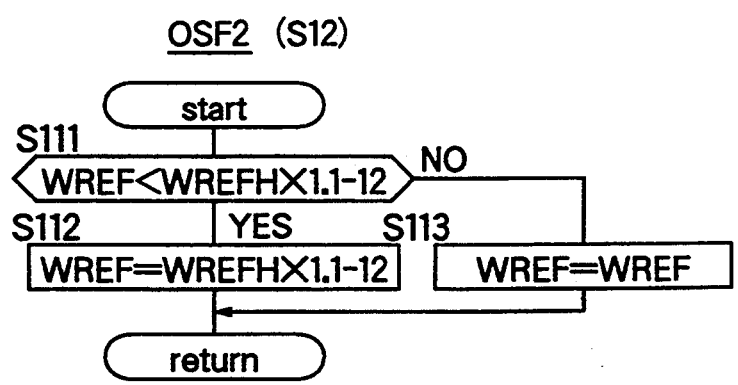
FIG. 11 is a flow chart showing the details of a step S12 shown in FIG. 7.
Figure 12:
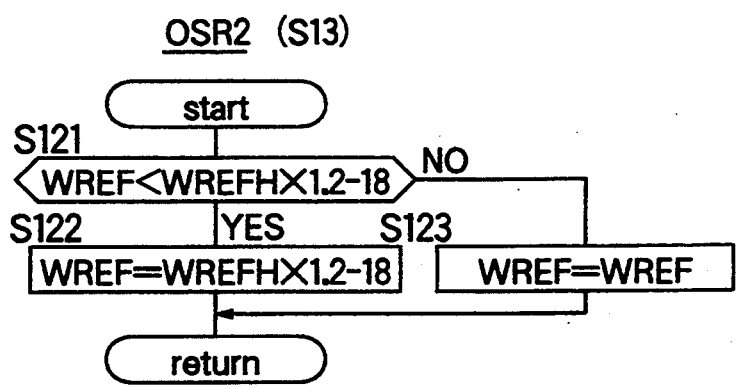
FIG. 12 is a flow chart showing the details of a step S13 shown in FIG. 7.

FIG. 11 and FIG. 12 are respectively the details of the steps S12 and S13 and show a flow chart where it is performed when the maximum estimated vehicle body speed WREFH is between 30 km per hour and 60 km per hour. As the details of the step S11 are the same as those of FIG. 8, they are omitted.

FIG. 11 shows a flow chart for setting the estimated vehicle body speed about the front wheel on the opposite side to the maximum estimated vehicle body speed wheel.

FIG. 12 shows a flow chart for setting the estimated vehicle body speed about the rear wheel on the opposite side to the maximum estimated vehicle body speed wheel. In this case, the vehicle wheel is adapted not to become smaller than a value where 18 km per hour has been subtracted from 1.2 times of the maximum estimated vehicle body speed WREFH.

Figure 13:
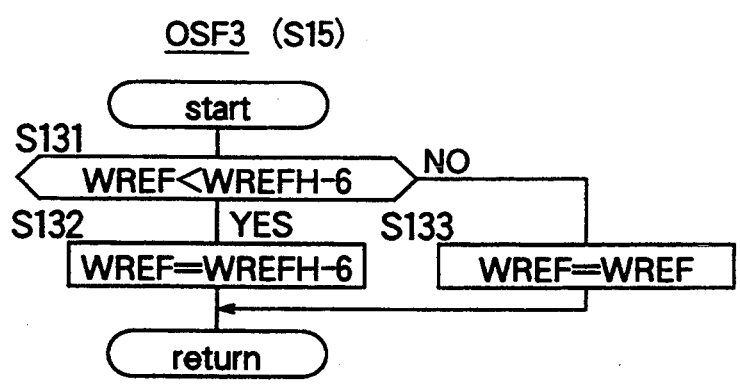
FIG. 13 is a flow chart showing the details of a step S15 shown in FIG. 17.
Figure 14:
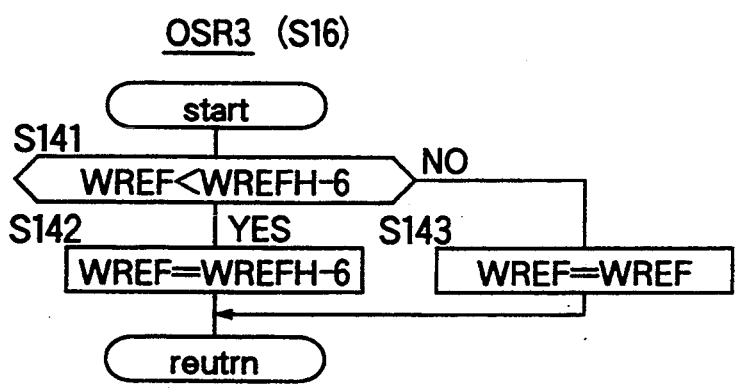
FIG. 14 is a flow chart showing the details of a step S16 shown in FIG. 7.

FIG. 13 and FIG. 14 are respectively the details of the steps S15 and S16, showing a flow chart where the maximum estimated vehicle body speed WREFH is 60 km per hour or more. As the details of the step S14 are the same as FIG. 8, they are omitted.

FIG. 13 shows a flow chart for setting the estimated vehicle body speed about the front wheel on the opposite side to the maximum estimated vehicle body speed wheel. In this case, the vehicle wheel is adapted not to become smaller than a value where 6 km per hour has been subtracted from the maximum estimated vehicle body speed WREFH.

FIG. 14 shows a flow chart for setting the estimated vehicle body speed about the rear wheel on the opposite side to the maximum estimated vehicle body speed wheel. In this case, the vehicle wheel is adapted not to become smaller than a value where 6 km per hour has been subtracted from the maximum estimated vehicle body speed WREFH.

Change of the shift width in the estimated vehicle body speed according to the maximum estimated vehicle body speed WREFH in this manner is considered on the basis of the difference between inner and outer wheel speed when the vehicle runs in a corner at the minimum radius. When the maximum estimated vehicle body speed is small, an inner wheel is considered much slower as compared with the outer wheel. When the maximum estimated vehicle body speed is large, the minimum turning radius of the vehicle becomes large. In this case, the estimated vehicle body speed about the remaining three wheels from the maximum estimated vehicle body speed is not necessary to be by a large amount. Of course, the value or formula in FIG. 8–14 can be changeable according to a vehicle characteristic.

Figure 15:
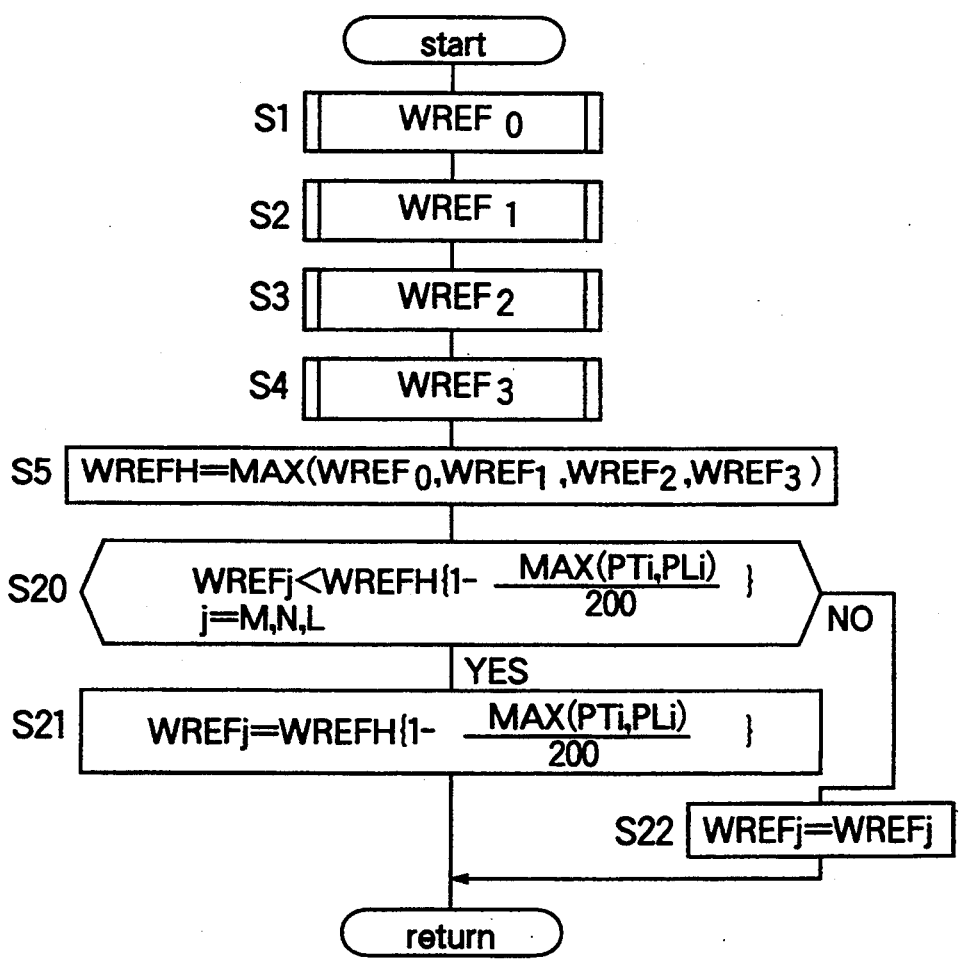
FIG. 15 is a flow chart showing a modified example in the second embodiment.

FIG. 15 shows a modified example in a second embodiment.

In FIG. 15, at step S20, it is judged whether or not the estimated vehicle body speeds WREFM, WREFN, WREFL (here the WREFM is a second fastest vehicle wheel speed, the WREFN is a third fastest vehicle wheel speed, the WREFL is the slowest vehicle wheel speed) of the remaining three wheels are larger than the bottom limit value to be given by the next equation (2)

$$WREFJ < WREFH\{1 - MAX(PTi, PLi)/200\} (J=M,N,L) \quad (2)$$

with respect to the maximum estimated vehicle body speed WREFH obtained at the step S5. When the values are larger, the step advances to step S22 and the estimated vehicle body speed of the vehicle wheel is adopted as it is. When the above described equation (2) is not satisfied, the step advances to step S21. The estimated vehicle body speed is set in a value shown by the next equation (3) about the respective vehicle wheels of respective three wheels of the remaining vehicle wheels.

$$WREFJ = WREFH\{1 - MAX(PTi, PLi)/200\} \quad (3)$$

In the above described equation (3), preferably the maximum value of MAX (PTi,PLi)/200 is made 0.25 and the minimum value is 0.03. At this time, the comparison equation (2) with the maximum estimated vehicle body speed WREFH may be varied in terms of the position relation with the maximum estimated vehicle body speed vehicle body as in the second embodiment.

The lower a road surface $\mu$ is, the larger the minimum cornering radius is. This means that as the road surface $\mu$ gets smaller, the shift width can be set small.

Figure 16:
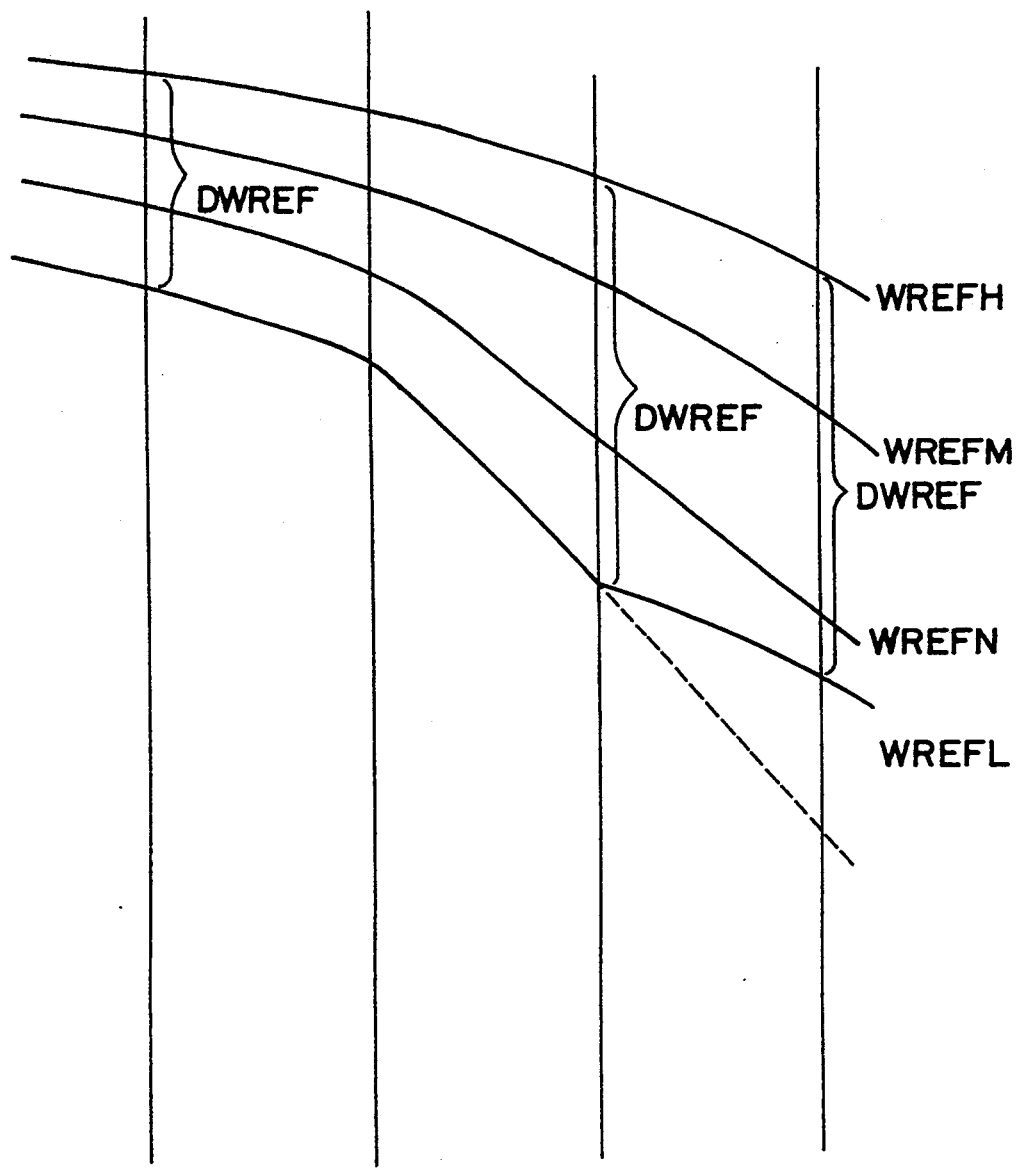
FIG. 16 is a graph showing the operation of the second embodiment.

The tolerance difference DWREF (FIG. 16) between the maximum estimated vehicle body speed WREFH and the minimum estimated vehicle body speed WREFL is small when the wheel cylinder fluid pressure is low and becomes larger as the wheel cylinder fluid pressure becomes larger by the control operation as in FIG. 15. The difference between the maximum estimated vehicle body speed and the minimum estimated vehicle body speed is adapted to be made large as the wheel cylinder fluid pressure under the antilock brake control operation is higher. An estimated vehicle body speed considering the vehicle body speed and the friction coefficient $\mu$ of the road surface can be computed by such construction as described hereinabove.

As is clear from the foregoing description, the estimated vehicle body speed calculating apparatus of the present invention is adapted to calculate the estimated vehicle body speed independently about each of the four wheels of a vehicle. As a limit value $((-)\Delta WREF)$ of the reduction speed is set in accordance with the wheel cylinder fluid pressure which is in approximately proportional relation with the frictional coefficient $\mu$ value of the road surface is set, a limit value $((-)\Delta WREF)$ can be set larger on the high $\mu$ road surface or smaller on the low $\mu$ road surface. The estimated vehicle body speed can be calculated more correctly and also, a antilock brake control operation conformed with the road surface condition can be effected.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An estimated vehicle body speed calculating apparatus for calculating for each control cycle, an estimated vehicle body speed of a vehicle, comprising:

means for respectively detecting a turning speed of each vehicle wheel;

means for calculating for each control cycle, a vehicle wheel speed and a vehicle wheel speed reduction of each vehicle wheel in accordance with the detected turning speed;

wheel cylinder fluid pressure detecting means for detecting a wheel cylinder fluid pressure of said each vehicle wheel;

limit speed reduction setting means for setting a limit value of the vehicle wheel reduced speed based on the wheel cylinder fluid pressure detected;

estimated vehicle body speed calculating means for calculating the estimated vehicle body speed, wherein the estimated vehicle body speed is set to the vehicle wheel speed calculated for each control cycle in which the vehicle wheel reduced speed is smaller than the limit reduced speed, and wherein the estimated vehicle body speed is set to the value of the estimated vehicle body speed for the previous control cycle added to the limit reduced speed for each control cycle in which the vehicle wheel reduced speed is larger than the limit reduced speed;

means for detecting lock indications of said each vehicle wheel;

means for effecting antilock brake controlling operation when the lock indications are detected; and memory means for retaining the wheel cylinder fluid pressure at a time when the locking indications are detected, wherein said limit speed reduction setting means sets the limit value of the reduced speed in accordance with a larger value obtained from a comparison of the wheel cylinder fluid pressure retained in said memory means and the fluid pressure detected by said wheel cylinder fluid pressure detecting means.

2. An estimated vehicle body speed calculating apparatus as defined in claim 1, where the limit reduced speed setting means sets the limit value of the reduced speed by a maximum wheel cylinder fluid pressure among a plurality of wheel cylinder fluid pressures associated with a plurality of vehicle wheels.

3. An estimated vehicle body speed calculating apparatus as defined in claim 1, wherein said limit speed reduction setting means sets the limit value of the reduced vehicle wheel speed based on a maximum wheel cylinder fluid pressure among a plurality of wheel cylinder fluid pressures associated with a plurality of vehicle wheels and a plurality of wheel cylinder fluid pressures retained by said memory means.

4. An estimated vehicle body speed calculating apparatus as defined in claim 1, further comprising:

means for setting a bottom limit value for the estimated vehicle body speed.

5. An estimated vehicle body speed calculating apparatus as defined in claim 4, wherein said bottom limit value setting means sets a first bottom limit value with regard to the vehicle wheel on the same side as the vehicle wheel detected in the maximum estimated vehicle body speed, and a second bottom limit value with regard to a vehicle wheel on the opposite side to the vehicle wheel detected in the maximum estimated vehicle body speed, so that a difference between the maximum estimated vehicle body speed and said first bottom limit value is less than a difference between the maximum estimated vehicle body speed and said second bottom limit value.

6. An estimated vehicle body speed calculating apparatus as defined in claim 1, where said limit value setting means sets a bottom limit value based on a plurality of wheel cylinder fluid pressures associated with a plurality of vehicle wheels and a plurality of wheel cylinder fluid pressures retained by said memory means.

* * * * *

UNITED STATES PATENT AND TRADEMARK OFFICE
CERTIFICATE OF CORRECTION

PATENT NO. : 5,430,652
DATED : July 4, 1995
INVENTOR(S) : H. FUJIOKA

Page 1 of 4

It is certified that error appears in the above-indentified patent and that said Letters Patent is hereby corrected as shown below:

On the title page, item [57], "Abstract", line 7, change "judgement" to ---judgment---.

On the title page, item, [75], "Inventors", line 1, change "Hiedaki" to ---Hideaki---.

At column 1, line 19, change "valve" to ---value---.

At column 1, line 22, change "the shortening of" to ---shorten---.

At column 1, line 26, change "Although a" to ---A---.

At column 1, lines 28 and 29, delete "as a means for obtaining the vehicle body speed, it"

At column 2, line 20, change "large" to ---large,---.

At column 2, line 29, change "a" to ---the---.

At column 2, line 62, after "turning," insert ---and---.

At column 3, line 52, delete "a".

At column 3, line 60, delete "a".

At column 4, line 1, delete "reference" (second occurrence).

UNITED STATES PATENT AND TRADEMARK OFFICE
CERTIFICATE OF CORRECTION

PATENT NO. : 5,430,652
DATED : July 4, 1995
INVENTOR(S) : H. FUJIOKA

It is certified that error appears in the above-indentified patent and that said Letters Patent is hereby corrected as shown below:

At column 4, line 2, delete "character".

At column 4, line 7, change "portion" to ---portions---.

At column 4, line 32, change "acceleration.)" to ---acceleration).---.

At column 4, line 37, change "((31)AWREF)" to ---((-)AWREF)---.

At column 4, line 47, change "((-(WREF)" to ---((-)WREF)---.

At column 4, line 47, before "WREF" insert ---A---.

At column 5, line 56, delete "a" (both occurrences).

At column 6, line 20, change "the step" to ---time---.

At column 6, line 26, delete "as".

At column 7, line 13, after "At" insert ---this---.

At column 7, line 23, change "As" to ---At---.

At column 7, line 25, after "issued" insert ---and---.

At column 7, line 43, change "regards" to ---regard---.

UNITED STATES PATENT AND TRADEMARK OFFICE
CERTIFICATE OF CORRECTION

PATENT NO. : 5,430,652
DATED : July 4, 1995
INVENTOR(S) : H. FUJIOKA

It is certified that error appears in the above-indentified patent and that said Letters Patent is hereby corrected as shown below:

At column 7, line 48, change "A step" to ---Step---.

At column 7, line 48, delete "a".

At column 7, line 67, delete "good".

At column 8, line 5, delete "a" (second occurrence).

At column 8, line 6, change "01" to ---#1---.

At column 8, line 9, change "a" (second occurrence) to ---the---.

At column 8, line 57, change "slate" to ---side---.

At column 9, line 33, delete "of".

At column 9, line 39, after "as" insert ---in---.

UNITED STATES PATENT AND TRADEMARK OFFICE
CERTIFICATE OF CORRECTION

PATENT NO. : 5,430,652
DATED : July 4, 1995
INVENTOR(S) : H. FUJIOKA

It is certified that error appears in the above-indentified patent and that said Letters Patent is hereby corrected as shown below:

At column 9, line 66, after "be" insert ---shifted---.

At column 9, line 67, change "FIG. 8-14" to ---FIGS. 8 through 14---.

At column 10, line 63, change "a" to ---an---.

Signed and Sealed this

Nineteenth Day of March, 1996

Attest:

BRUCE LEHMAN

*Attesting Officer*  *Commissioner of Patents and Trademarks*